United States Patent
Chhabra

(10) Patent No.: US 9,622,163 B2
(45) Date of Patent: Apr. 11, 2017

(54) QUICKLY JOINING WI-FI NETWORKS USING NEIGHBORING ACCESS POINTS

(71) Applicant: Apple Inc., Cupertino, CA (US)

(72) Inventor: Kapil Chhabra, Milpitas, CA (US)

(73) Assignee: Apple Inc., Cupertino, CA (US)

(*) Notice: Subject to any disclaimer, the term of this patent is extended or adjusted under 35 U.S.C. 154(b) by 721 days.

(21) Appl. No.: 13/631,647

(22) Filed: Sep. 28, 2012

(65) Prior Publication Data

US 2014/0064140 A1  Mar. 6, 2014

Related U.S. Application Data

(60) Provisional application No. 61/697,458, filed on Sep. 6, 2012.

(51) Int. Cl.
| | | |
|---|---|---|
| *H04W 48/20* | (2009.01) | |
| *H04W 84/18* | (2009.01) | |
| *H04L 12/24* | (2006.01) | |
| *H04L 12/751* | (2013.01) | |
| *H04W 84/12* | (2009.01) | |

(52) U.S. Cl.
CPC ............ *H04W 48/20* (2013.01); *H04L 41/12* (2013.01); *H04L 45/02* (2013.01); *H04W 84/18* (2013.01); *H04W 84/12* (2013.01)

(58) Field of Classification Search
CPC ......... H04L 41/12; H04L 45/02; H04W 84/18
See application file for complete search history.

(56) References Cited

U.S. PATENT DOCUMENTS

| | | | | |
|---|---|---|---|---|
| 2007/0115877 | A1* | 5/2007 | Zhen ................... | H04W 72/10 370/329 |
| 2008/0064404 | A1* | 3/2008 | Zhang .................. | H04W 36/08 455/436 |
| 2009/0318075 | A1* | 12/2009 | Kwon .................... | H04N 5/50 455/3.01 |
| 2010/0165921 | A1* | 7/2010 | Maheshwari et al. ........ | 370/328 |
| 2011/0032913 | A1* | 2/2011 | Patil ..................... | H04W 72/08 370/338 |
| 2011/0099606 | A1* | 4/2011 | Choi et al. ......................... | 726/3 |
| 2011/0194442 | A1* | 8/2011 | Narasimhan ...... | H04W 36/0083 370/252 |
| 2013/0316706 | A1* | 11/2013 | Knauft ................. | H04W 68/04 455/435.1 |
| 2014/0010157 | A1* | 1/2014 | Hsieh ................... | H04W 48/16 370/328 |

OTHER PUBLICATIONS

A. Mishra, M. Shin, and W. Arbaugh, "Context Caching Using Neighbor Graphs for Fast Handoffs in a Wireless Network," to appear, Proc. IEEE INFOCOM 2004.*

* cited by examiner

*Primary Examiner* — Michael Thier
*Assistant Examiner* — Brian Cox
(74) *Attorney, Agent, or Firm* — Sterne, Kessler, Goldstein & Fox P.L.L.C.

(57) ABSTRACT

One embodiment of the present invention provides a device for joining a known Wi-Fi network. During operation, the device performs a scanning operation during a scanning process to find a known access point of a WLAN for the device to join. Next, if the scanning operation finds an access point, the device determines whether the access point neighbors a known access point. If so, the device attempts to associate with the known access point by performing a scanning operation on the specific channel associated with the known access point.

24 Claims, 5 Drawing Sheets

QUICKLY JOINING WI-FI NETWORKS USING NEIGHBORING ACCESS POINTS

RELATED APPLICATION

This application hereby claims priority under 35 U.S.C. §119 to U.S. Provisional Application No. 61/697,458, entitled "Quickly Joining Wi-Fi Networks Using Neighboring Access Points," by Kapil Chhabra, filed 6 Sep. 2012.

BACKGROUND

Related Art

Smartphone applications, such as email clients and web browsers, often require an available Internet connection as soon as the user launches the application on the device. Such applications then use the connection to access web pages, email, and other online content. Smartphones generally use a cellular or Wi-Fi® connection to access the Internet. Moreover, applications typically prioritize Wi-Fi connections over cellular connections because Wi-Fi is often cheaper and faster than cellular connectivity. Thus, users benefit when applications automatically connect to Wi-Fi as often as possible.

Implementing this behavior in a device, however, introduces a unique problem, particularly when the device is waking up from sleep mode. When a smartphone device wakes up, the device takes time to establish a Wi-Fi connection with a known access point. This process may take up to six seconds. Such a delay may cause applications to report connectivity issues, which degrades the user experience.

An additional side effect of this delay occurs when the device gives up on Wi-Fi and falls back to a cellular connection. Switching back to a Wi-Fi connection when one finally appears is not seamless. Because the device has already established a socket for the application, the device cannot simply hand off the application midway from a cellular connection to Wi-Fi. As a result, the switch to back to Wi-Fi is often disruptive, resulting in a further degradation of the user experience.

SUMMARY

One embodiment of the present invention provides a device for joining a known Wi-Fi network. During operation, the device performs a scanning operation during a scanning process to find a known access point of a WLAN for the device to join, where a known access point is an access point that was previously stored in a database in the device. Next, if the scanning operation finds an access point, the device determines whether the access point is a discovered neighbor, wherein a discovered neighbor is an access point that neighbors a known access point and was previously stored in the database. If so, the device attempts to associate with the known access point by performing a scanning operation on the specific channel associated with the known access point.

DETAILED DESCRIPTION

Figure 1:
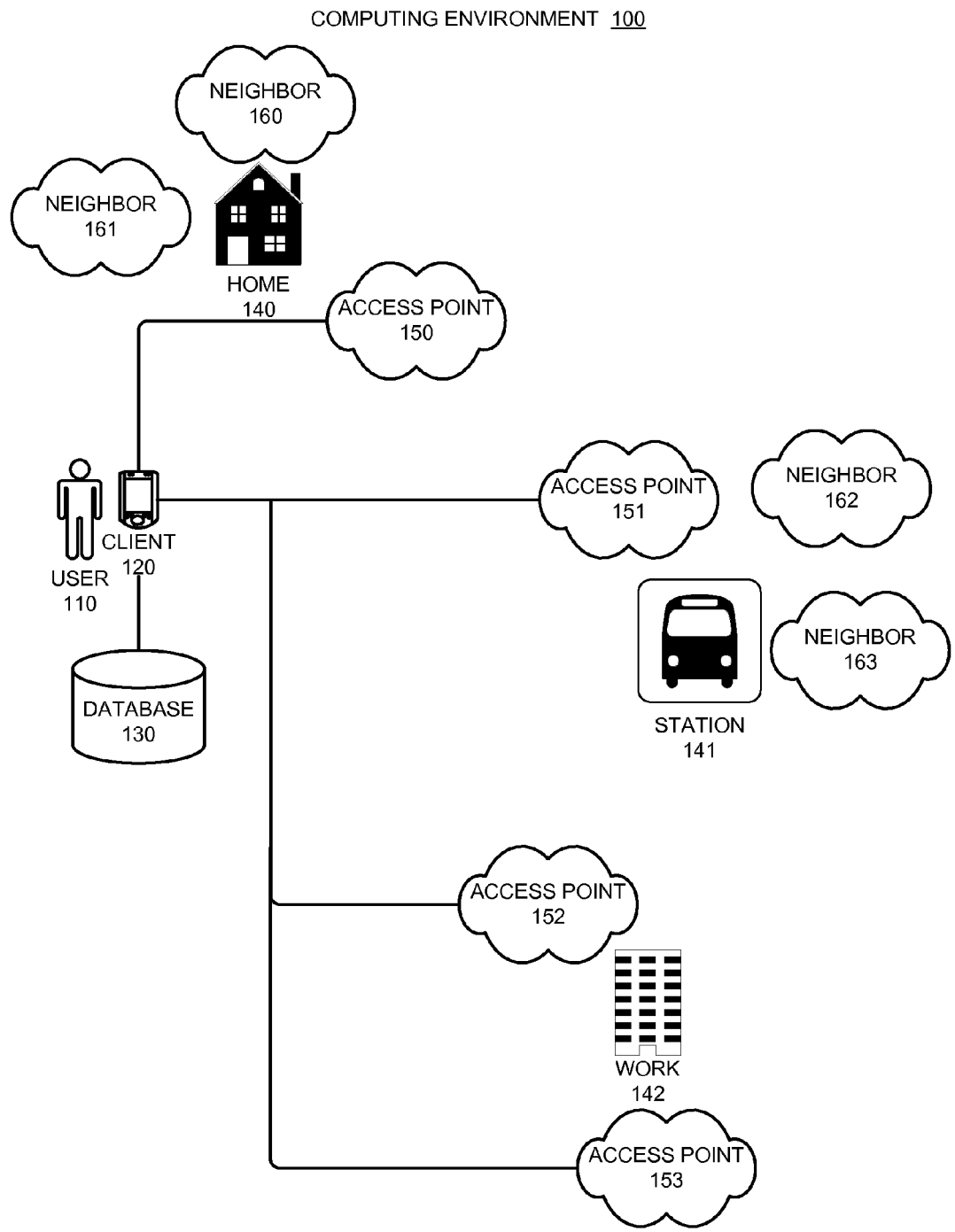
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention use opportunistic scanning and optimized channel prioritization strategies to reduce the amount of latency experienced when a Wi-Fi enabled device connects to a Wi-Fi network. As a result, device applications are able to access online content sooner. Note that the term Wi-Fi may refer to IEEE 802.11, which is a set of standards developed for wireless local area network (WLAN) technology.

In some cases, embodiments of the present invention offer various advantages. Users may be able to use smartphone applications that require an Internet connection with less delay after waking their phone. For example, rather than having to wait six seconds before using an email client or a web browsing application, the user may check their email or browse the web in far less time after the smartphone screen turns back on. Typically, the six-second delay itself consists of two components. The first component comprises the time needed to scan a maximum of 35 Wi-Fi channels in 2.4 and 5.0 GHz bands. The second component comprises the connection establishment process once the device finds the Wi-Fi access point on the correct channel. The first component often makes up the majority of the six-second delay. Because access points only send out beacon frames once every 110 ms, passively scanning a channel for that access point may take up to 110 ms. Thus, scanning 35 channels would take nearly four seconds.

In some cases, embodiments of the present invention may also prevent situations where a Wi-Fi-enabled device degrades the user experience by falling back to a cellular connection. If a device is not able to secure a Wi-Fi connection for an application within a certain period after waking up, the device falls back to a cellular connection. Because Wi-Fi connections are cheaper and faster than cellular connections, the user may want to switch back to a Wi-Fi connection as soon as possible. However, the device cannot seamlessly hand off this connection from cellular to Wi-Fi because the application has already established a socket. Thus, the inevitable disruption caused by the switch back to Wi-Fi further degrades the user's experience. Embodiments of the present invention may prevent this scenario by reducing the amount of time needed to establish a Wi-Fi connection after waking up a device. A faster Wi-Fi connection process may translate to fewer fallbacks to a cellular connection, thus improving the user's experience.

One embodiment of the present invention provides a device for joining a known Wi-Fi network. During operation, the device performs a scanning operation during a scanning process to find a known access point for the device to join. Note that performing a scanning operation involves scanning a Wi-Fi channel. Also, note that scanning may refer to passive scanning, where the device passively listens to the channel for beacon frames from access points in range, or active scanning, where the device emits probe request frames and listens for probe response frames from access points in range. Next, if the scanning operation finds an access point, the device determines whether the access point neighbors a known access point. If so, the device attempts to associate with the known access point by performing a scanning operation on the specific channel associated with the known access point. Note that a known access point is an access point that was previously associated with the device. Also, note that an access point neighbors another access point if the device may discover the former while associated with the latter. Finally, note that embodiments of the present invention may exist as control logic that is coupled to an integrated circuit. Handsets may include this integrated circuit as a component along with other components such as a radio transceiver and an antenna.

In some embodiments of the present invention, when the device is associated with a given access point, the device stores the given access point in a database. Note that associating with a given access point for the first time and storing that access point in a database makes that access point a "known access point." Also, note that storing the given access point in a database may include writing that access point to persistent storage.

In some embodiments of the present invention, while the device is associated with the given access point, the device opportunistically scans for access points that neighbor the given access point. The device then stores any discovered neighbor in the database.

In some embodiments of the present invention, when storing the given access point in the database, the device stores the given access point's service set identifier (SSID), basic service set identification (BSSID), channel, and the time the device last associated with the given access point. Note that the device may forego storing the SSID and rely solely upon the BSSID as the primary means to uniquely identify the given access point. Also, note that the device may include other attributes related to the given access point such as the security key or the received signal strength indication (RSSI).

In some embodiments of the present invention, when storing the discovered neighbor in the database, the device stores the discovered neighbor's BSSID, channel, a reference to the given access point which is neighbored by the discovered neighbor, and the number of times the discovered neighbor was found while the device was associated with the given access point. Note that the device may include other attributes related to the discovered neighbor such as the discovered neighbor's SSID, RSSI, and discovery date. Also, note that the device may use the given access point's BSSID or SSID as a reference to the given access point that is neighbored by the discovered neighbor.

In some embodiments of the present invention, the scanning process has the device scan all channels sequentially. For example, the device may start the scan at channel six. The scan continues through each consecutive channel up to the highest channel. Then, the scan wraps around and scans from channel one back up to channel five. If the device discovers a known access point, the device breaks off the scan and immediately associates with the known access point. If the device discovers a neighbor, the device: (1) retrieves the known access point neighbored by the discovered neighbor, (2) retrieves the channel used by the known access point, which may or may not be consecutive to the previously scanned channel, and (3) scans the channel. If, by scanning that channel, the device finds the known access point, the device immediately associates with that access point and ends the scanning process. Otherwise, the device continues the sequential scan.

In some embodiments of the present invention, the scanning process has the device scan the channels in three stages. During the first stage, the device scans the channel used by the known access point that was most recently associated with the device. During the second stage, the device scans the remaining channels used by the n most recently associated known access points. During the final stage, the device scans all remaining channels. Note that the remaining channels in the second stage may or may not include the channel scanned in the first stage. Also, note that the remaining channels in the third stage may or may not include the channels scanned in the first and second stages.

In some embodiments of the present invention, while the device is associated with the given access point, opportunistically scanning for access points that neighbor the given access point involves the following. When the device is not transferring data, the device listens on channels for any beacon sent by access points that neighbor the given access point. Note that opportunistic scanning is scanning done while the device (1) is associated with an access point but (2) is not transferring data. Also, note that this scanning may be active or passive scanning. For example, a user wakes up a smartphone to check email. The smartphone subsequently associates with an access point, giving the smartphone's email client Internet access. After the email client finishes downloading the email, the smartphone stops transferring data. Because the connection is idle, the smartphone may scan for neighboring access points without disrupting data transfers.

In some embodiments of the present invention, the device does the following to determine whether the access point neighbors a known access point. The device searches the database for a discovered neighbor whose BSSID matches the access point's BSSID. If the device finds a discovered neighbor, the device determines whether the discovered neighbor possesses a sufficient confidence level. Note that the device may match the access point to a discovered neighbor by SSID rather than by BSSID.

In some embodiments of the present invention, to determine whether a discovered neighbor possesses a sufficient confidence level, the device determines whether the number of times the device found the discovered neighbor is greater than a threshold value. Note that the device may use numerous factors in determining a discovered neighbor's confidence level. Factors may include, but are not limited to, the neighbor's RSSI level at discovery. For example, if a discovered neighbor's RSSI level is always low during discovery, the device may assign a lower confidence level to the discovered neighbor.

In some embodiments of the present invention, the device does the following to associate with the known access point. First, the device retrieves the discovered neighbor's reference to the known access point from the database. The device then uses the reference to retrieve the specific channel used by the known access point from the database. Next, the device scans that channel. Finally, if the device does not find the known access point on that specific channel right away, the device continues to scan that specific channel more frequently than the other channels while the scanning process continues.

Computing Environment

FIG. 1 illustrates the computing environment 100 of a device user 110 in accordance with an embodiment of the present invention. Computing environment 100 includes a number of computer systems, which may include any type of computer system based on a microprocessor, a mainframe computer, a digital signal processor, a portable computing device, a personal organizer, a device controller, or a smartphone. More specifically, referring to FIG. 1, computing environment 100 includes user 110, client 120, database 130, locations 140-142, known access points 150-153, and neighboring access points 160-163.

Client 120 may include any node on a network including computational capability and a mechanism for joining a Wi-Fi network such as a smartphone, a PDA, a tablet computer, or a laptop computer.

User 110 may include an individual, a group of individuals, an organization, a group of organizations, a computing system, a group of computing systems, or any other entity that can interact with computing environment 100.

Database 130, which resides within client 120, may include any type of system for storing data in non-volatile storage. This includes, but is not limited to, relational database management systems, text files, XML files and/or spreadsheets. This also includes, but is not limited to, systems based upon magnetic, optical, or magneto-optical storage devices, as well as storage devices based on flash memory and/or battery-backed up memory. Note that database 130 may be coupled to a server, to a client, or directly to a network.

Locations 140-142 may include any location in user 110's commute where access points can be found including homes, train stations, proprietary businesses, libraries, and offices. Such access points may provide free public Wi-Fi, non-free public Wi-Fi, or Wi-Fi that is private only to user 110.

Known access points 150-153 may include any access point that client 120 has previously associated with in the past. Some known access points may not require client 120 to remember a Wi-Fi protected access (WPA) key in order to rejoin because these known access points provide public unencrypted Wi-Fi. Other known access points may require client 120 to remember a WPA key in order to rejoin because these known access points provide only encrypted Wi-Fi.

Neighboring access points 160-161 are access points that client 120 can discover while associated with known access point 150 because neighboring access points 160-161 are all proximate to known access point 150. However, neighboring access points 160-161 are also access points client 120 cannot join for reasons such as not having the correct WPA key.

Note that different embodiments of the present invention may use different system configurations, and are not limited to the system configuration illustrated in computing environment 100.

System

Figure 2:
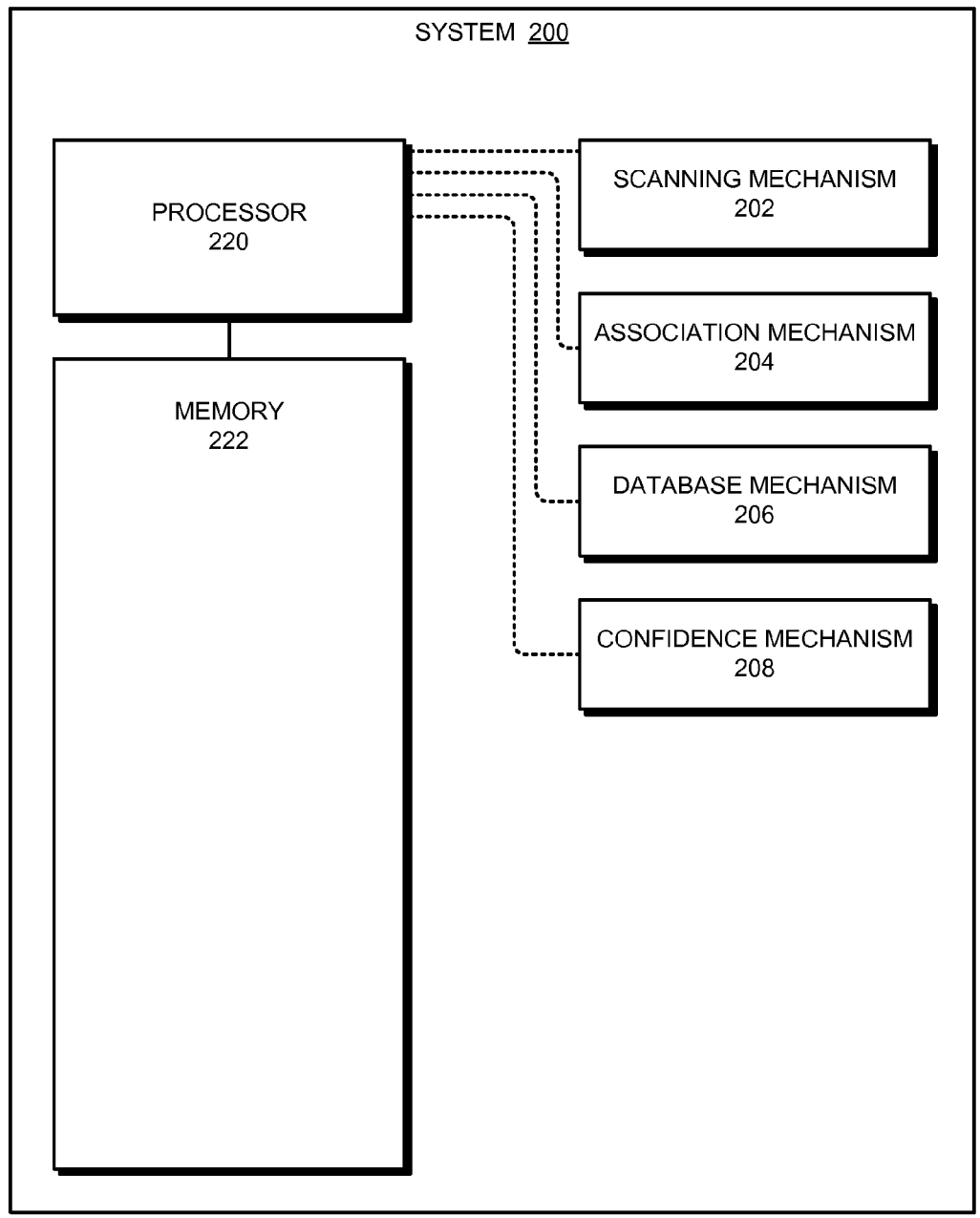
FIG. 2 illustrates a system in accordance with an embodiment of the present invention.

FIG. 2 illustrates a system 200 in accordance with an embodiment of the present invention. As illustrated in FIG. 1, system 200 may comprise client 120, database 130, access point 150, or any combination thereof. System 200 may also include scanning mechanism 202, association mechanism 204, database mechanism 206, confidence mechanism 208, processor 220, and memory 222. Client 120 may use (1) scanning mechanism 202 to scan for known access points 150-153 and neighboring access points 160-161, (2) association mechanism 204 to join one of the known access points 150-153, and (3) database mechanism 206 to interface with database 130. Furthermore, client 120 may use confidence mechanism 208 to determine how confident client 120 is regarding whether a neighboring access point, such as one of the neighboring access points 160-161, actually neighbors a known access point, such as one of the known access points 150-153.

Quickly Joining Wi-Fi Networks Using Neighbors

Figure 3:
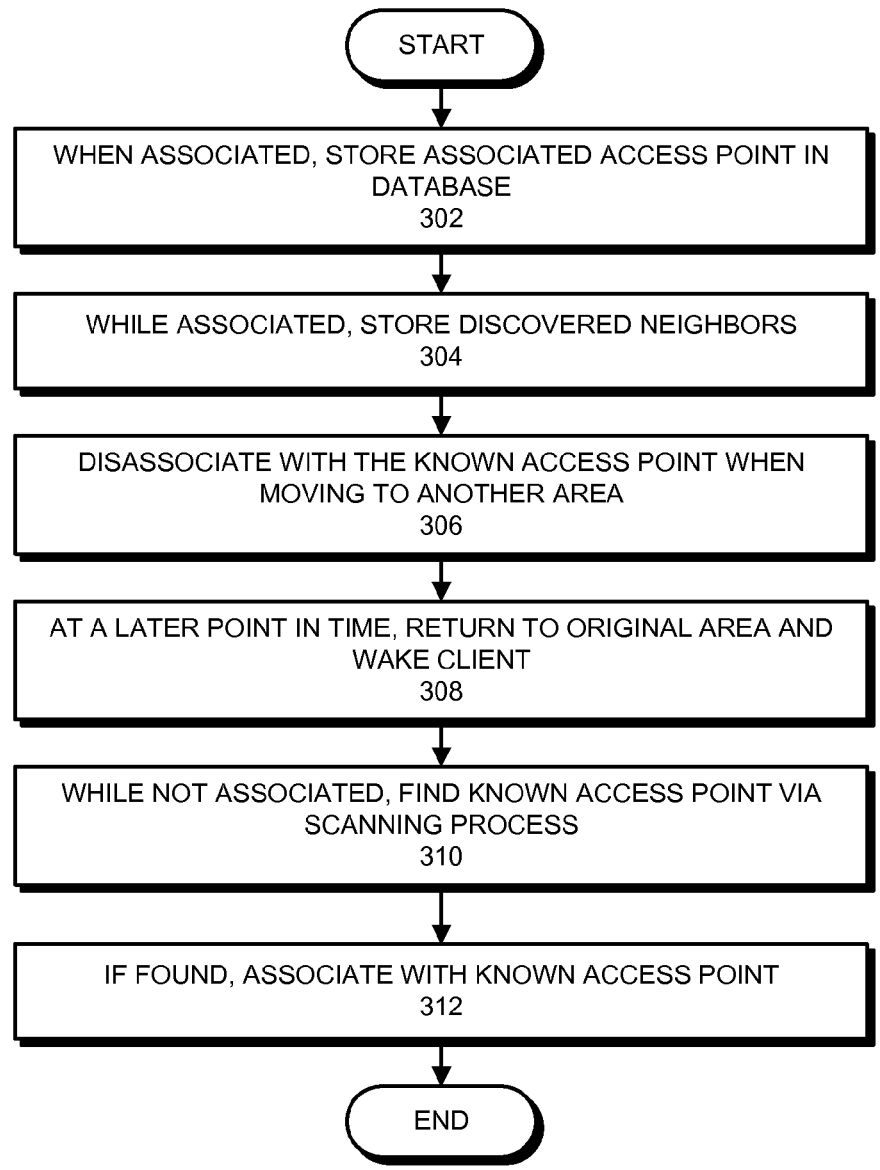
FIG. 3 presents a flow chart illustrating the process of quickly joining Wi-Fi networks using information regarding neighboring access points in accordance with an embodiment of the present invention.
Figure 4:
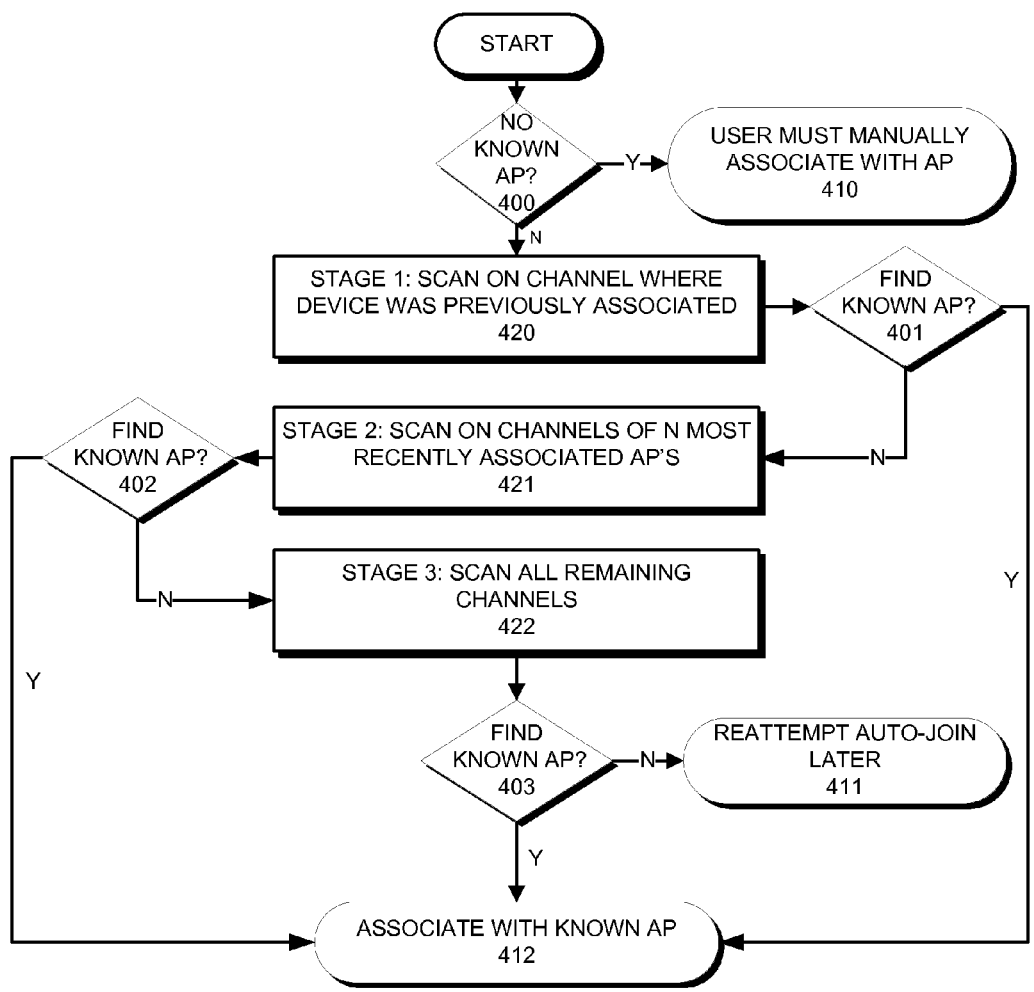
FIG. 4 presents a flow chart illustrating the three stages of the process for finding Wi-Fi networks to associate with in accordance with an embodiment of the present invention.

The next three figures explain how the client 120 uses neighboring access points to join a Wi-Fi network more quickly. FIG. 3 presents a flow chart that illustrates how client 120 (1) searches for any nearby known access points to join and (2) records any neighboring access points discovered during these searches as user 110 moves from one location to another. Next, FIG. 4 illustrates how client 120 divides the search for a known access point into three stages. Finally, FIG. 5 explains how client 120 utilizes the discovered neighboring access points in each of these stages.

In FIG. 3, the device operates in two main phases: (1) while associated with a given access point, client 120 discovers neighbors, and (2) while not associated with any access point, client 120 searches for a known access point.

While client 120 is associated with a known access point, client 120 may store information about the known access point in database 130 (operation 302). The database stores the known access point's SSID, BSSID, channel, and the time client 120 last associated with the given access point. For example, when user 110 is at location 140 and her smartphone client 120 associates with home access point 150, database mechanism 206 stores several attributes of home access point 150 into an entry created in database 130. First, database mechanism 206 stores "home_network" in the SSID attribute. Next, database mechanism 206 stores "01:23:45:67:89:ab" in the BSSID attribute. Next, database mechanism 206 stores "11" in the channel attribute. Finally, database mechanism 206 stores "8:00 AM, Jan. 4, 2010" in the attribute that represents the time client 120 last associated with home access point 150.

While client 120 is associated with a known access point, scanning mechanism 202 opportunistically scans for neighboring access points that are in close proximity to the known access point (operation 304). Database mechanism 206 stores a discovered neighbor's BSSID, the neighbor's channel, a reference to the known access point that the neighbor is proximate to, and the number of times client 120 discovered the neighbor while client 120 and the known access point were associated. For example, when user 110 is at location 140 and her smartphone client 120 is associated with home access point 150, client 120 attempts to scan for other nearby access points while client 120 is not transferring data. In this example, client 120 discovers the following access points: home neighbor 160 and home neighbor 161. Then, database mechanism 206 stores several attributes of home neighbor 160 into an entry created in database 130. First, database mechanism 206 stores "01:23:45:67:89:ac" in the BSSID attribute. Next, database mechanism 206 stores "one" in the channel attribute. Next, database mechanism 206 stores the BSSID of home access point 150 (which is 01:23:45:67:89:ab) in the attribute that represents the known access point neighbored by home neighbor 160. Finally, database mechanism 206 stores "15" in the confidence attribute because client 120 has found home neighbor 160 15 times in opportunistic scans while client 120 and home access point 150 were associated together.

Additionally, database mechanism 206 stores several attributes of home neighbor 161 into an entry created in database 130. First, database mechanism 206 stores "01:23:45:67:89:ad" in the BSSID attribute. Next, database mechanism 206 stores "six" in the channel attribute. Next, database mechanism 206 stores the BSSID of home access point 150 (which is 01:23:45:67:89:ab) in the attribute that represents the known access point neighbored by home neighbor 161. Finally, database mechanism 206 stores "19" in the confidence attribute because client 120 has found home neighbor 161 19 times in opportunistic scans while client 120 and home access point 150 were associated together.

Because Wi-Fi networks are limited in their range, when user 110 moves to another location, client 120 has to disassociate with the known access point (operation 306). For example, when user 110 leaves her home 140 to go to work, client 120 eventually moves out of range of home access point 150. Additionally, client 120 may disassociate with home access point 150 regardless of location when user 110 shuts down or reboots client 120.

By the end of the day, client 120 has traveled to other locations including locations 141-142. Association mechanism 204 has associated the client with other access points such as known access points 151-153. Scanning mechanism 202 has discovered other neighbors such as neighboring access points 162-163. Many of these other access points lie on channels that differ from the channel used by home access point 150. Because user 110 was at location 141 before reaching location 140, client 120 last associated with station access point 151.

In the example above, when user 110 returns to location 140 and powers up client 120 (operation 308), scanning mechanism 202 immediately engages in a scanning process to find any known access points (operation 310).

If scanning mechanism 202 is able to find a known access point, such as home access point 150, during the scanning process, association mechanism 204 associates client 120 with the known access point (operation 312).

Three-Stage Scanning Process

FIG. 4 presents a flow chart that illustrates three stages in the process for finding Wi-Fi networks to associate with in accordance with an embodiment of the present invention.

There are up to 35 channels to scan for known access points. Database 130 typically remembers all access points and neighbors discovered by scanning mechanism 202. If database 130 does not contain any known access points (decision 400), then the scanning process may not work until user 110 manually associates client 120 with an access point (terminator 410).

The scanning process has three stages. In the first stage, scanning mechanism 202 scans the channel used by the known access point that client 120 was most recently associated with (operation 420). If scanning mechanism 202 discovers a known access point (decision 401), association mechanism 204 associates client 120 with the known access point (terminator 412). If scanning mechanism 202 fails to discover a known access point or a neighbor in that channel (decision 401), client 120 proceeds to the next stage of the scanning process.

In the second stage, scanning mechanism 202 scans the remaining channels used by the n most recently associated known access points (operation 421). If scanning mechanism 202 discovers a known access point in one of the channels (decision 402), association mechanism 204 associates client 120 with the known access point (terminator 412). If scanning mechanism 202 fails to discover a known access point or a neighbor in those n channels (decision 402), client 120 proceeds to the next stage of the scanning process.

In the third stage, scanning mechanism 202 scans all remaining channels that were not scanned in stages one and two (operation 422). If scanning mechanism 202 discovers a known access point (decision 403), association mechanism 204 associates client 120 with the known access point (terminator 412). If scanning mechanism 202 fails to discover a known access point in the remaining channels (decision 403), client 120 concludes that no known access points are in range and falls back to another type of connection. Later on, client 120 may re-attempt to join a Wi-Fi network with each subsequent attempt occurring at various time intervals (terminator 411). Note that the longer the client goes without finding a Wi-Fi network, the less frequent the client's searches for a Wi-Fi network are. Conversely, if the client detects a Wi-Fi network after a long period without detecting any Wi-Fi networks, the client may search for Wi-Fi networks more frequently for a period.

How Found Access Points are Used

Figure 5:
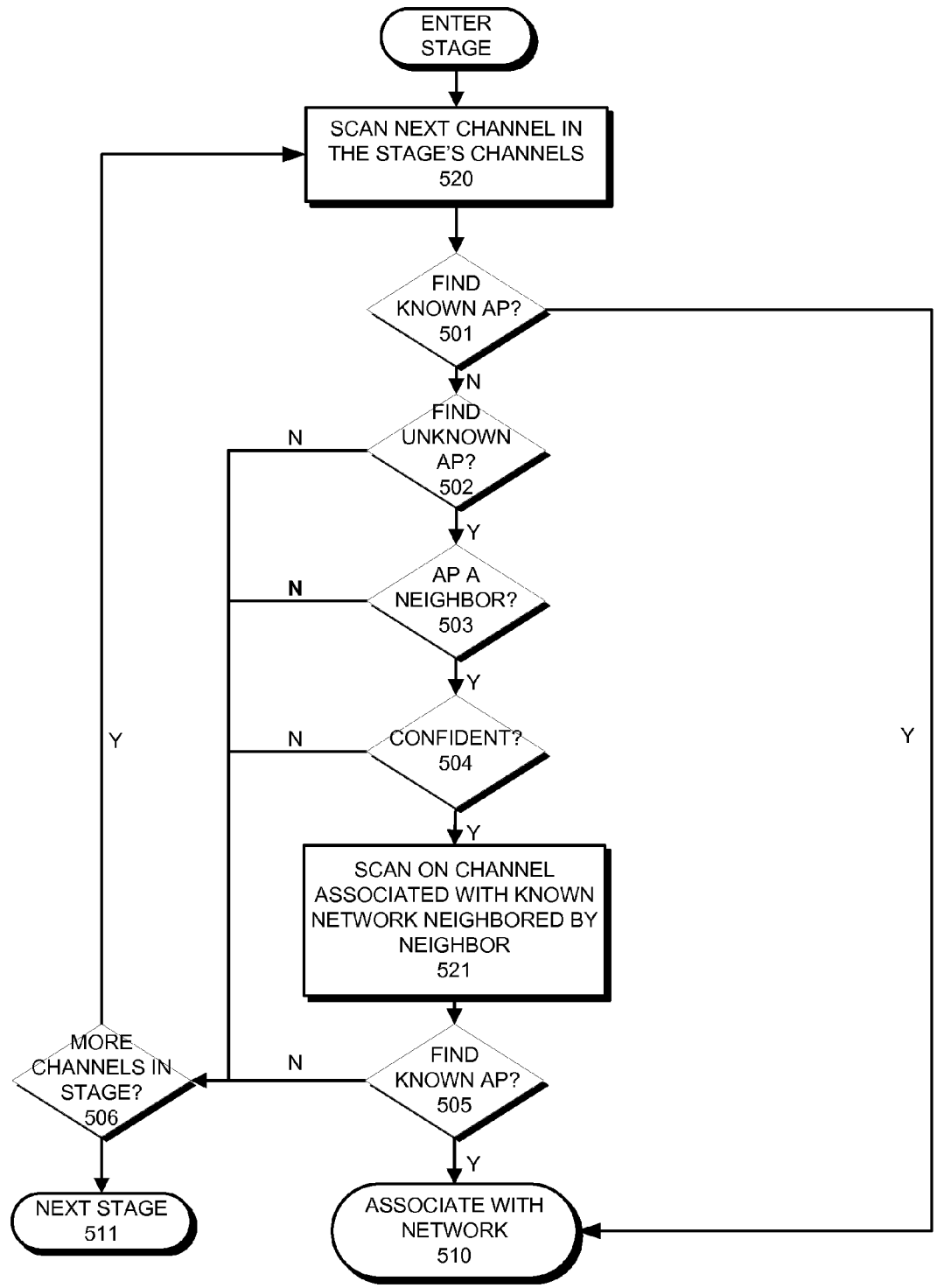
FIG. 5 presents a flow chart illustrating how the device uses found access points during the scanning process in accordance with an embodiment of the present invention.

FIG. 5 presents a flow chart illustrating how the device uses found access points during the scanning process in accordance with an embodiment of the present invention. In each of the three stages, as scanning mechanism 202 scans the stage-specific group of channels (operation 520), if a known access point is found (decision 501), the device immediately stops the scanning process and associates with the known access point (terminator 510). No more channels are scanned. No more stages are executed.

On the other hand, if scanning mechanism 202 finds an unknown access point (decision 502), database mechanism 206 searches database 130 to determine whether the unknown access point matches a discovered neighbor (decision 503). If there is a match, confidence mechanism 208 determines whether the matching neighbor possesses a certain confidence level (decision 504). To do so, confidence mechanism 208 retrieves the value of the confidence attribute (the number of times the neighbor has appeared while client 120 and a known access point were associated). If that value is higher than a threshold value, the device becomes confident that client 120 is in close proximity to a known access point and proceeds to scan the known access point's channel.

Database mechanism 206 first retrieves the known access point that is neighbored by the matching neighbor and then extracts the known access point's channel from that entry. Scanning mechanism 202 then scans that channel (operation 521). If scanning mechanism 202 finds the known access point (decision 505), association mechanism 204 associates client 120 with the known access point (terminator 510) and terminates the scanning process. Even if scanning mechanism 202 does not find the known access point immediately, scanning mechanism 202 continues to scan the known access point's channel more frequently than the other channels as it continues the scanning process.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A portable electronic device comprising:
storage hardware for storing a database, the database comprising information on a neighboring access point corresponding to a known access point from a plurality of known access points, wherein the neighboring access point is in proximity to the known access point; and
a processor coupled to the storage hardware, wherein the processor is configured to:
scan one or more channels;
identify a signal from the neighboring access point;
access the database to find the known access point corresponding to the neighboring access point;
determine that the neighboring access point is associated with a confidence level that satisfies a threshold value, wherein the confidence level reflects a number of times the neighboring access point was discovered while the portable electronic device was previously associated with the known access point; and
in response to the determination that the neighboring access point is associated with the confidence level that satisfies the threshold value, associate with the known access point.

2. The portable electronic device of claim 1, wherein to previously associate with the known access point, the processor is further configured to:
associate with a given access point; and
store information of the given access point in the database as the known access point.

3. The portable electronic device of claim 2, wherein the processor is further configured to:
while associated with the given access point, discover the neighboring access point in proximity to the given access point; and
store information of the neighboring access point in the database.

4. The portable electronic device of claim 3, wherein the information of the neighboring access point comprises:
a basic service set identifier (BSSID);
a channel;
a reference to the known access point;
a service set identifier (SSID);
a received signal strength (RSSI);
a discovery date; or
a number of times the neighboring access point is discovered while the portable electronic device is associated with the given access point.

5. The portable electronic device of claim 2, wherein the information of the given access point comprises:
a service set identifier (SSID);
a basic service set identifier (BSSID);
a security key;
a received signal strength indication (RSSI);
a channel; or
a time the portable electronic device associated with the given access point.

6. The portable electronic device of claim 3, wherein, to discover the neighboring access point in proximity to the given access point, the processor is configured to:
while not transferring data, listen on channels for beacons sent by access points in proximity to the known access point.

7. The portable electronic device of claim 1, wherein, to scan, the processor is configured to scan the one or more channels sequentially.

8. The portable electronic device of claim 1, wherein, to scan, the processor is configured to:
scan a channel from the one or more channels associated with a most recently used known access point;
scan remaining channels from the one or more channels associated with n most recently used known access points; and
scan remaining channels from the one or more channels.

9. The portable electronic device of claim 1, wherein, to identify the signal from the neighboring access point, the processor is configured to:
search the database for the neighboring access point whose basic service set identifier (BSSID) or service set identifier (SSID) is associated with the known access point.

10. The portable electronic device of claim 1, wherein, to associate with the known access point, the processor is configured to:
acquire, from the database, a channel used by the known access point; and
scan the channel used by the known access point.

11. The portable electronic device of claim 10, wherein the processor is further configured to:
determine that the known access point is not found on the channel used by the known access point; and
scan the channel used by the known access point more frequently than other channels of the one or more channels.

12. The portable electronic device of claim 1, wherein the neighboring access point is an access point with which the portable electronic device does not join.

13. The portable electronic device of claim 1, wherein the confidence level is based at least in part on a received signal strength indication (RSSI) level of the neighboring access point at discovery.

14. The portable electronic device of claim 1, wherein, to scan, the processor is configured to:
emit a probe request frame; and
listen for probe responses to the probe request frame.

15. A computer-implemented method for a portable electronic device, the method comprising:

identifying during a scanning operation, a neighboring access point, wherein the neighboring access point is in proximity to a known access point;

determining that the neighboring access point is associated with a confidence level that satisfies a threshold value, wherein the confidence level indicates a number of times the neighboring access point is discovered while the portable electronic device was previously associated with the known access point, and wherein the confidence level is based at least in part on a received signal strength indication (RSSI) level of the neighboring access point at discovery;

accessing a database to find the known access point corresponding to the neighboring access point; and in response to the determining, associating with the known access point.

16. The computer-implemented method of claim 15, wherein the previously associating with the known access point comprises:

associating with a given access point; and storing information of the given access point in the database as the known access point.

17. The computer-implemented method of claim 16, further comprising:

while associated with the given access point, discovering the neighboring access point in proximity to the given access point; and storing information of the neighboring access point in the database.

18. The computer-implemented method of claim 17, wherein the information of the neighboring access point comprises:

a basic service set identifier (BSSID);

a channel;

a reference to the known access point;

a service set identifier (SSID);

an RSSI;

a discovery date; or a number of times the neighboring access point is discovered while the portable electronic device is associated with the given access point.

19. The computer-implemented method of claim 16, wherein the information of the given access point comprises:

a service set identifier (SSID);

a basic service set identifier (BSSID);

a security key;

an RSSI;

a channel; or a time the portable electronic device associated with the given access point.

20. The computer-implemented method of claim 15, wherein the scanning operation comprises:

scanning a channel associated with a most recently used known access point;

scanning remaining channels associated with n most recently used known access points; and scanning remaining channels.

21. The computer-implemented method of claim 19, wherein the identifying the neighboring access point comprises:

searching the database for the neighboring access point whose basic service set identifier (BSSID) or service set identifier (SSID) is associated with the known access point.

22. The computer-implemented method of claim 15, wherein the associating with the known access point comprises:

acquiring, from the database, a channel used by the known access point; and scanning the channel used by the known access point.

23. The computer-implemented method of claim 22, further comprising:

determining that the known access point is not found on the channel used by the known access point; and scanning the channel used by the known access point more frequently than other channels.

24. A non-transitory computer readable storage medium having instructions stored therein, which when executed by a processor, cause the processor to perform operations, the operations comprising:

scanning a channel of an access point for a beacon;

identifying the access point as a neighboring access point, wherein the neighboring access point is in proximity to a known access point, and wherein the neighboring access point is associated with a confidence level;

determining that the confidence level satisfies a threshold value, wherein the confidence level indicates a number of times the neighboring access point is discovered while the portable electronic device was previously associated with the known access point;

accessing a database to find the known access point corresponding to the neighboring access point; and in response to the determining, associating with the known access point.

* * * * *